United States Patent [19]

Mutchnik

[11] 4,003,537
[45] Jan. 18, 1977

[54] MOUNTINGS FOR TUBULAR METAL LEGS

[76] Inventor: Melvin Mutchnik, 5804 Gist Ave., Baltimore, Md. 21215

[22] Filed: Jan. 19, 1976

[21] Appl. No.: 650,354

[52] U.S. Cl. .................. 248/425; 248/188
[51] Int. Cl.² ............................. F16M 13/00
[58] Field of Search .......... 248/188, 425, 224; 403/331, 343; 339/256 SP

[56] References Cited
UNITED STATES PATENTS

| | | | |
|---|---|---|---|
| 2,726,907 | 12/1955 | Krauss | 248/425 |
| 2,779,642 | 1/1957 | Matthews | 248/425 |
| 3,134,566 | 5/1964 | Beene | 248/188 |
| 3,142,467 | 7/1964 | Mutchnik et al. | 248/188 |
| 3,228,359 | 1/1966 | Rich | 248/188.8 |
| 3,452,324 | 6/1969 | Fitzpatrick | 339/256 SP |
| 3,504,877 | 4/1970 | Lyon | 248/188 |
| 3,550,069 | 12/1970 | Teagno | 339/256 SP |
| 3,620,492 | 11/1971 | Jennings | 248/188 |

Primary Examiner—Robert A. Hafer
Attorney, Agent, or Firm—Samuel Lebowitz

[57] ABSTRACT

A rugged and long-lasting mounting for a tubular metal leg to the underside of a furniture unit through the intermediary of a sheet metal supporting bracket affixed to the latter, with spaced arms extending downwardly and parallely from the opposite sides of a sheet metal supporting plate on the bracket adapted to abut closely the upper end of said leg. A flange extends inwardly from each of the arms at an acute angle thereto for sliding interengagement with correspondingly cut slots spanning opposed parallel chords on the leg which subtend substantial angles of about 90°, to bring the leg and plate into said close abutment while preventing loosening and eventual undesired disengagement therebetween in a direction transverse to said sliding interengagement.

11 Claims, 9 Drawing Figures

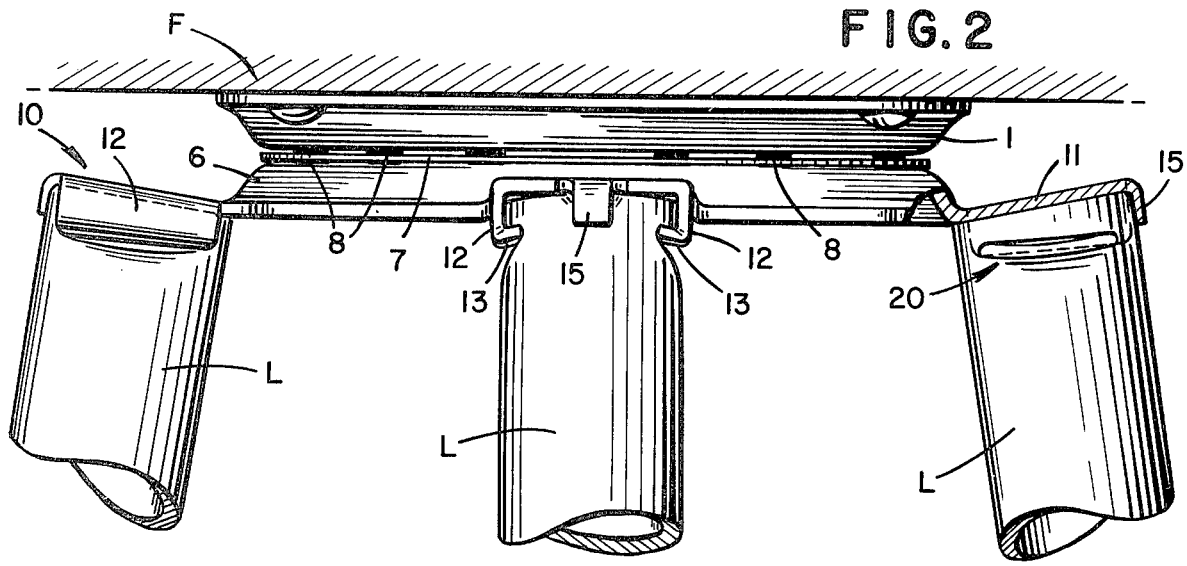
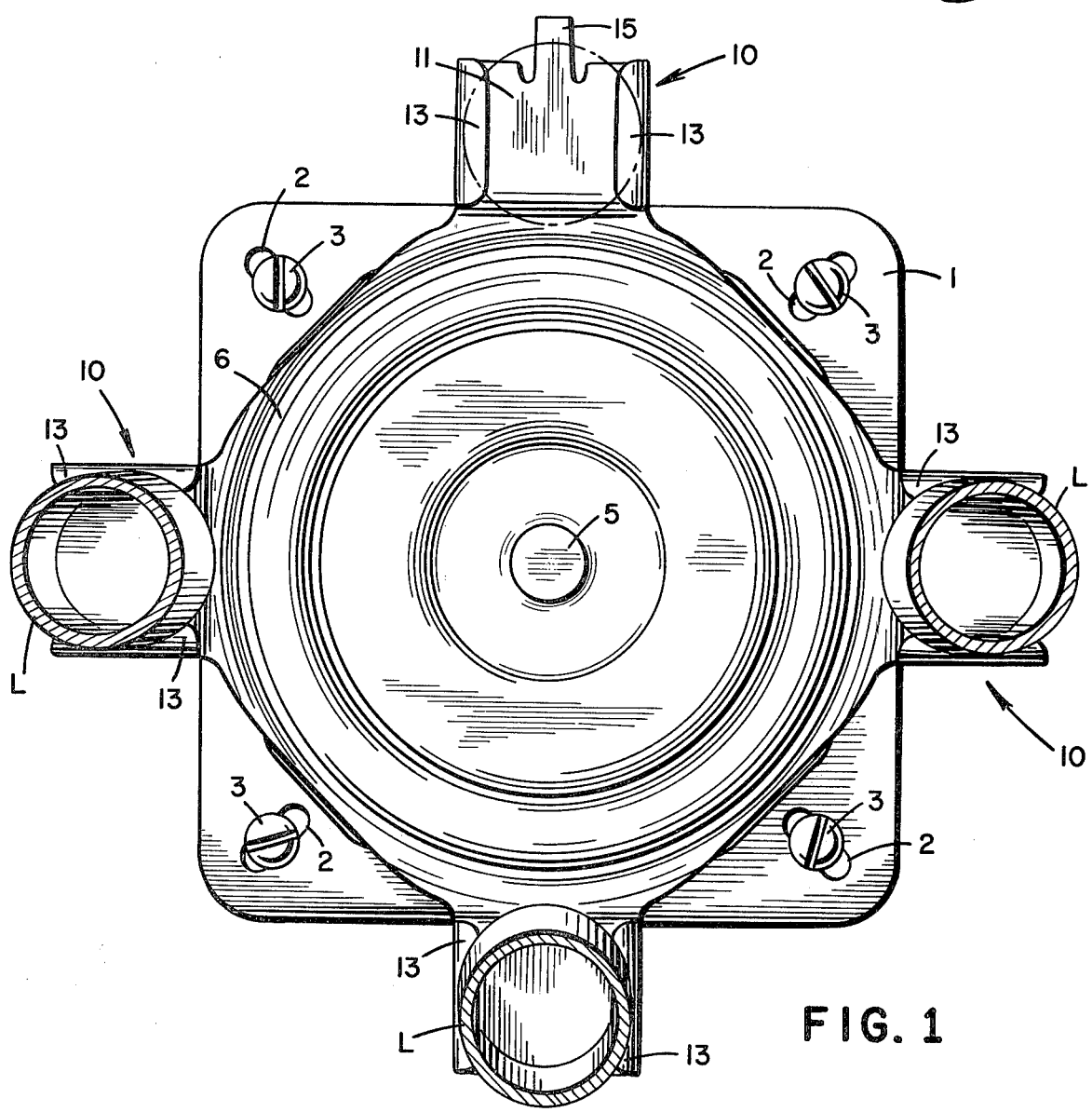

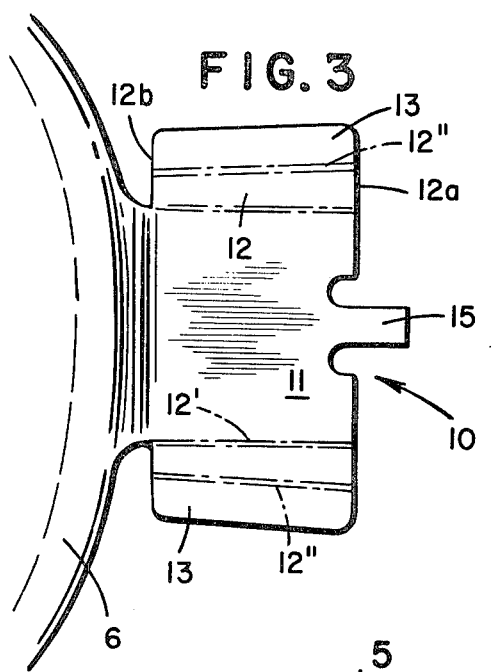
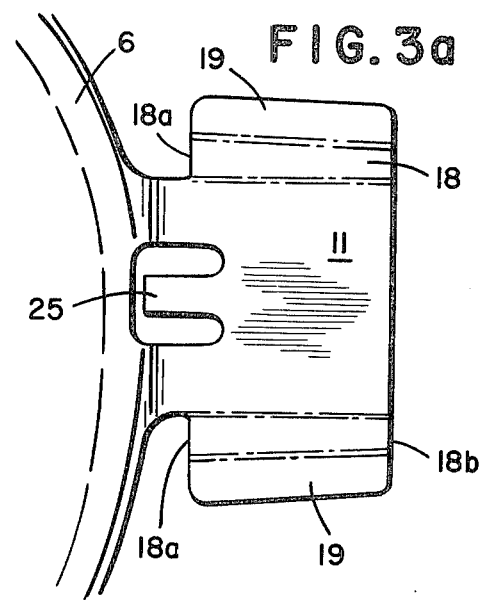
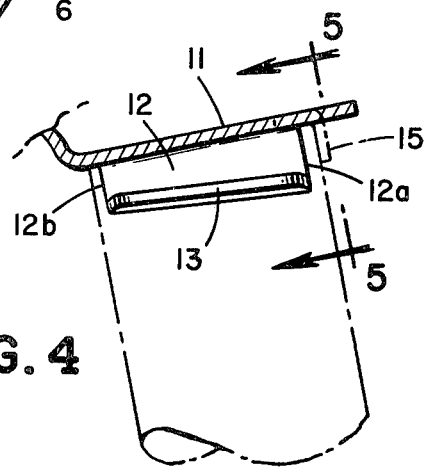
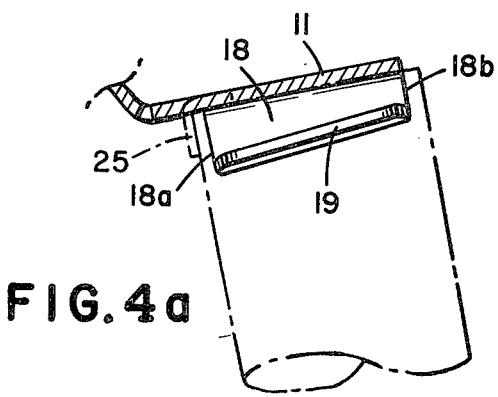
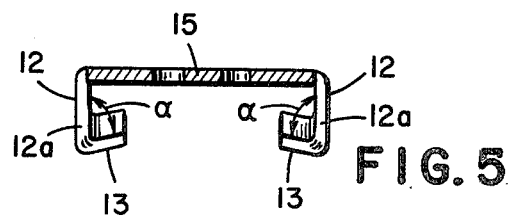
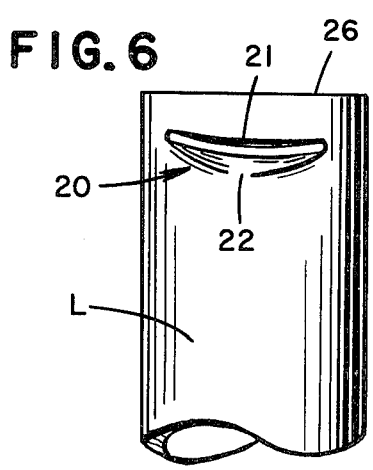
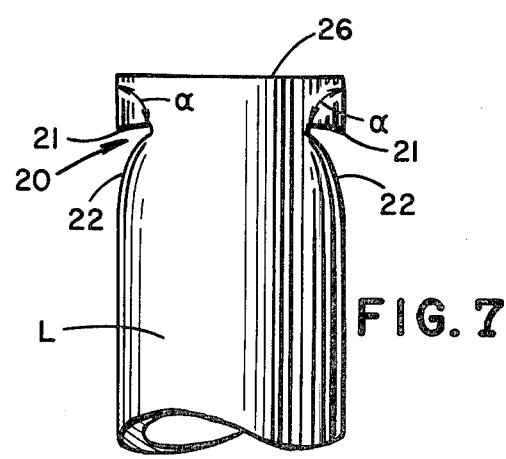

MOUNTINGS FOR TUBULAR METAL LEGS

This invention relates to mountings for tubular metal legs, and more particularly to sheet metal mounting brackets adapted to be affixed to the underside of furniture units for the detachable connection of tubular metal legs thereto.

It is the object of the present invention to provide rugged and reliable mountings for tubular metal legs, which may be shipped in a knockdown state and assembled quickly and easily, without need for special tools or skilled labor.

The instant invention aims to improve bracket mountings of the type disclosed in my earlier U.S. Pat. No. 3,142,467, July 28, 1964, so that the integrity of the assembly is maintained over a long period of time, despite heavy loadings thereon, without need for the use of heavier gauge metal brackets. The invention is particularly useful in leg mountings for swivel supports of all types of furniture units, especially rotary bar stools, which are frequently subjected to irregular loadings and abuse.

Other objects and purposes will appear from the detailed description of the invention following hereinafter, taken in conjunction with the accompanying drawings, wherein FIG. 1 is a bottom view of a swivel assembly for stools or other furniture units bearing four supporting legs;

FIG. 2 is a front elevation of the assembly shown in FIG. 1;

FIG. 3 is a plan view of a portion of one of the components of the swivel assembly following its stamping from sheet metal, preparatory to the bending thereof to form a bracket support for a tubular metal leg;

FIG. 3a is a plan view similar to FIG. 3, of an alternate embodiment of the invention for the formation of the bracket support;

FIG. 4 is a sectional view of the bracket support following its bending, with the final bending of the retaining lug shown in dotted lines, shaped from the stamping shown in FIG. 3;

FIG. 4a is a front elevation similar to FIG. 4 of the bracket support shaped from the stamping shown in FIG. 3a;

FIG. 5 is a sectional view along lines 5—5 of FIG. 4;

FIG. 6 is a front elevation of the upper end of the tubular metal leg for engagement with the bracket supports shown in FIGS. 1 to 5; and FIG. 7 is an end view of FIG. 6.

In the drawings is shown a swivel assembly adapted for mounting to the underside of a furniture unit F which may be a stool, table, chair, television set and the like, of the type shown in U.S. Pat. Nos. 2,779,642, Jan. 29, 1957, and 2,726,907, Dec. 13, 1955. The essential elements of the swivel assembly are comprised of a suitably contoured upper plate 1 pivoted to a lower plate 6 at the centers thereof by pin or rivet 5, with preferably a cage 7 of ball bearings 8 travelling in suitable annular depressions to form the circular tracks for the bearings within the swivel members 1 and 6.

The upper swivel plate 1 is affixed to the underside of the furniture unit by means of screw or bolt fasteners 3 extending through circular or elongate openings 2 in the plate at the corners thereof. The cooperating swivel member 6 is stamped from a plate of sheet metal provided with radial extensions, as shown in FIGS. 1, 3 and 4, whereat are stamped bracket outlines which are bent to form retainers for the upper ends of tubular metal legs L. Preferably, these radial extensions are provided at the corners of a plate member of generally square outline, but these extensions may also project from a plate of any other polygonal or circular outline.

In order to attain extremely sturdy leg mountings for rotatable stools which are subjected, at times, to heavy and irregular loadings depending upon weight and sitting habits of the user, the bracket mounting shown in the inventor's above-mentioned earlier patent is improved, so that the possibility of the upper ends of the legs working loose from the brackets is eliminated. Thereby, the useful life of the stool is lengthened without recourse to utilization of heavier gauge sheet metal bracket supports, with the attendant increase in cost. This is done by interconnecting the upper end of the tubular leg with the retaining flanges of the supporting bracket through reentrant angles, which resist their mutual disengagement. This resistant action to disengagement between the parts is enhanced by increasing the areas of engagement between the parts without weakening their structural integrity.

As shown in the drawings, the lower plate 6 is stamped from a sheet of metal with four radial extensions 10 projecting beyond the periphery, only one of which is shown in FIGS. 3 and 3a since the others are identical in outline. The radial extensions 10 consist of a main central portion 11 which projects beyond the periphery of the plate 6, and arms 12 are bent from the parallel lateral edges 12' in parallel planes perpendicular to plate 11. Additionally, the portions beyond the edges 12' are bent along edges 12" and these are inclined slightly with respect to the edges 12', to form inwardly directed flanges 13 in allochiral relation to each other. Thus, the depth of the arms 12 at the outer ends 12a of the latter is slightly greater than the depth of the arms at the opposite ends 12b adjacent to the swivel plate member 6.

The bending operations may be executed in any desired manner to bring the flanges 13 below the lateral edges of the plate 11, in facing relation to each other, as shown in FIGS. 1, 2 and 5. Thus, the flanges 13 may be bent initially from the plane of the plate 11 along lines 12" for more than 90° to form an acute angle α between the outer arm portions 12 and flanges 13, as shown in FIG. 5. Thereafter, the inner arm portions 12 may be bent from the plane of plate 11, at right angles to the latter, along lines 12', to bring the parts into the position shown in FIG. 5, with spaced arms extending downwardly in parallel to each other. This acute angle may approximate 80° to 85° relative to the vertically extending arms 12, while the downwardly extending arms 12 extend perpendicularly to the plane of the plate 11.

Following the bending of the stamped radial extensions 10 to form the confining arms 12 and the inwardly extending flanges 13 extending at acute angles to the latter, which in effect provide tracks for guiding the upper ends of the tubular legs L into abutting contact with the underside of the plates 11, each of the radial extensions may be angled upwardly in order to effect a divergence of the legs from the swivel support and a consequent increase in stability. This inclination to the horizontal may be in the vicinity of about 8° to 12°.

As shown in FIGS. 3, 4 and 5 of the drawings, the inclination of the bending lines 12" relative to the bending lines 12', gives rise to a convergence of the planes of the flanges 13 towards plate 11 from the end 12a of greater depth to the end 12b of lesser depth of the lateral arms 12. A similar convergence is imparted to the slots which are cut in the tubular leg adjacent to the upper end thereof which is disposed in a plane perpendicular to the longitudinal axis of the leg, which end is adapted to abut closely the underside of plate 11.

These slots 20 are cut along opposite chordal segments adjacent to the upper end of the tubular leg L and these chordal segments subtend an angle of approximately 90° in order to effect an interconnection between the leg and the flanges 13 of the bracket mounting over an extended area. The diameter of the upper end of the leg is slightly less than the spacing between the arms 12. The slots 20 are cut at an acute angle $\alpha$ relative to the wall of the tubular leg, as indicated in FIG. 7, corresponding to the acute angle of the flanges relative to the downwardly extending arms 12, as indicated in FIG. 5. This angular incision results in a gradual convexity of the upper edge 21 of each slot above the deformation 22 of the leg below each slot. The inclination of the slots 20 relative to the circumferential edge 26 of the leg L as described above, permits the introduction of the leg, with the side thereof having the smaller displacement of the ends of the slots from the upper edge 26, into the guide afforded by the arms and flanges 12 and 13, into the end 12a of the latter. The leg may be advanced until it makes wedging contact with the lower face of the mounting plate 11, and the wedging action results in a tight interconnection between the parts. In order to increase the security of the engagement between the leg and bracket, a lug 15, at the mid-portion of the outer edge of the plate 11 (FIG. 3), may be bent into the position shown in dotted lines in FIG. 4, behind the posterior portion of the leg to restrain the leg from retrograde movement. The position of these parts is shown in FIG. 2.

The insertion of the leg into the guides afforded by the downwardly extending arms and flanges is a quick and rapid one, and is executed without any tools. Its permanent securement in place is assured by the transverse bending of the lug 15 from the plane of plate 11 against the upper end of leg L. After this is done, a stable interconnection between the parts is assured because any tendency for rocking of the tubular leg between the arms 12 results in a tightening of the engagement between the flange and the slotted leg on one side, which counteracts the tendency of the loosening of this engagement on the other side. This tendency, coupled with the fact that the engagement between the flanges and lateral surface of the upper end of the leg is effective over substantially half of the circumference of the leg results in a very rugged and secure assembly. Despite the stability of the assembly, the interconnection between the parts may be released by withdrawing the abutment 15 by a reverse bending thereof which permits the withdrawal of the leg from its wedging contact with the bracket support.

An alternate way of forming the bracket supports is shown in FIGS. 3a and 4a, by the provision of flanges 19 disposed at an acute angle to lateral arms 18 which are bent transversely from the plane of the supporting plate 11. In this construction, the bending lines are so disposed that the greater depth 18a of the guide arms 18 is proximate to the swivel ring 6 and the lesser depth 18b is at the outer end of the supporting bracket. In this construction, the legs are inserted from the center of the swivel outwardly and thereafter the retaining lug 25 is turned downwardly as indicated in dotted lines in FIG. 4a to maintain the assembly in integrated condition.

While I have shown the invention applied specifically to a swivel mounting with four radial extensions, the number may be varied and one with at least three radial extensions will provide adequate stability. Furthermore, the advantages of the invention may be realized by the application of its features to bracket supports for single legs, as disclosed in my above-mentioned earlier patent, and the legs may be designed for vertical or inclined disposition, depending upon individual needs. The legs may be of cylindrical outline throughout the length thereof, or they may be cylindrical at the upper portion thereof and merging into a tapered frusto-conical portion at the lower third or half of the leg adjacent to the floor support, all as well known in the art.

I claim:

1. In a mounting for a tubular metal supporting leg to the underside of a furniture unit,
   a. bracket supporting means affixed to the underside of the furniture unit for detachable connection with said leg, comprising a sheet metal supporting plate with a pair of integral spaced arms extending downwardly from opposite sides of said plate for a short depth, and spaced from each other a distance slightly greater than the diameter of the leg at its upper end,
   b. a narrow rigid flange extending inwardly from the free edge of each arm at an acute angle to the latter,
   c. said leg adapted for slidable engagement with said bracket support and having upwardly directed slots spanning opposed parallel chords of said tubular leg, below the upper edge thereof, a distance corresponding to said short depth, with the upper end of said leg adapted to contact said supporting plate, said slots being disposed at opposite circumferential portions of said tubular leg to form a pair of coupling lips, each with a convexly-shaped boundary at each of said portions adjacent to an intended deformation in the leg below said lip and bounded by the slot inwardly of said lip, and each lip engaging one of said flanges at a re-entrant angle to attain an interlocking and secure engagement therebetween in a direction transverse to the initial relative reciprocable movement incident to the sliding of each lip into interengagement with its respective flange.

2. A device as set forth in claim 1, wherein said slots in said tubular legs subtend approximately 90° of said circumferential portions for interengagement between said flanges and the upper end of said leg.

3. A device as set forth in claim 2, wherein the upper end of said tubular leg is in a plane perpendicular to the longitudinal axis thereof, for close abutting contact with said sheet metal supporting plate between said pair of integral spaced arms extending from the latter, said arms being deeper at one end whereat the end of the leg is slid into engagement with said plate, and said slots being correspondingly inclined toward said upper end of the leg to facilitate the mating interengagement between the latter and the flanges extending from the arms.

4. A device as set forth in claim 3, including a bendable lug at the mid-portion of said supporting plate between the deeper end of said arms for bending in a transverse plane behind the posterior portion of the upper end of the leg following its interconnection with the bracket supporting means, to prevent unintentional retrograde sliding movement of the leg relative to the bracket supporting means.

5. A device as set forth in claim 1, wherein said bracket supporting means is part of a swiveling assembly comprising a sheet metal member adapted to be fixedly mounted to the underside of the furniture unit with a freely rotatable swivel connection between said member and said supporting means.

6. A device as set forth in claim 5, wherein said supporting means is a second sheet metal member complemental to said first member, said second member being provided with at least three equidistantly displaced radial extensions from the periphery thereof, with said supporting plate disposed at each of said extensions.

7. A device as set forth in claim 6, wherein each extension is an integral part of said second sheet metal member, and is bent upwardly in a plane displaced at a small angle from the horizontal to direct the legs in divergent directions relative to said swivel connection.

8. A device as set forth in claim 1, wherein said bracket supporting means is part of a swiveling assembly comprising a sheet metal member adapted to be fixedly mounted to the underside of the furniture unit with a complemental second sheet metal member of substantially square outline having the center thereof connected to the center of said first member for relative rotary movement, radial extensions at the four corners of said second sheet metal member wherefrom are stamped the supporting plate, spaced arms and flanges at each of the corners, the upper end of said tubular leg being in a plane perpendicular to the longitudinal axis thereof, for close abutting contact with said sheet metal supporting plate between said pair of integral spaced arms extending from the latter, said arms being deeper at one end whereat the end of the leg is slid into engagement with said plate, and said slots each subtending an angle of about 90°, being correspondingly inclined toward said upper end of the leg to facilitate the mating interengagement between the latter and the flanges extending from the arms.

9. A device as set forth in claim 8, including a bendable lug at the mid-portion of said supporting plate between the deeper end of said arms for bending in a transverse plane behind the posterior portion of the upper end of the leg following its interconnection with the bracket supporting means, to prevent unintentional retrograde sliding movement of the leg relative to the bracket supporting means.

10. A device as set forth in claim 9, wherein said bendable lug is disposed at the end of said supporting plate at the outer periphery of said second member.

11. A device as set forth in claim 9, wherein said bendable lug is disposed at the end of said supporting plate proximate to the pivotal center of said second member.

* * * * *

UNITED STATES PATENT AND TRADEMARK OFFICE
CERTIFICATE OF CORRECTION

PATENT NO. : 4,003,537
DATED : January 18, 1977
INVENTOR(S) : MELVIN MUTCHNIK

It is certified that error appears in the above–identified patent and that said Letters Patent are hereby corrected as shown below:

Column 4, line 40, claim 1, "intended" should read --indented--.

Signed and Sealed this

Fifteenth Day of March 1977

[SEAL]

Attest:

RUTH C. MASON
Attesting Officer

C. MARSHALL DANN
Commissioner of Patents and Trademarks